(12) United States Patent
Matsuda et al.

(10) Patent No.: US 9,606,500 B2
(45) Date of Patent: *Mar. 28, 2017

(54) GEAR TRANSMISSION DEVICE, PROCESS UNIT INCLUDING THE GEAR TRANSMISSION DEVICE AND IMAGE FORMING APPARATUS INCLUDING SAME

(71) Applicants: Naoki Matsuda, Kanagawa (JP); Masahiro Ishida, Kanagawa (JP); Shinya Shimizu, Kanagawa (JP)

(72) Inventors: Naoki Matsuda, Kanagawa (JP); Masahiro Ishida, Kanagawa (JP); Shinya Shimizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,282

(22) Filed: Feb. 22, 2016

(65) Prior Publication Data

US 2016/0170367 A1 Jun. 16, 2016

Related U.S. Application Data

(63) Continuation of application No. 14/193,343, filed on Feb. 28, 2014, now Pat. No. 9,322,458.

(30) Foreign Application Priority Data

Mar. 12, 2013 (JP) .................................. 2013-049190

(51) Int. Cl.
*G03G 21/16* (2006.01)
*G03G 15/00* (2006.01)
*F16H 1/10* (2006.01)

(52) U.S. Cl.
CPC .............. *G03G 21/16* (2013.01); *F16H 1/10* (2013.01); *G03G 15/757* (2013.01);
(Continued)

(58) Field of Classification Search
CPC .. G03G 15/757; G03G 15/1615; G03G 21/16; G03G 21/1647; F16H 1/10
See application file for complete search history.

(56) References Cited

U.S. PATENT DOCUMENTS 2,851,896 A 9/1958 Ordway
3,901,096 A 8/1975 Woody
(Continued)

FOREIGN PATENT DOCUMENTS

CN 1385761 A 12/2002
JP S60-129533 U 8/1985
(Continued)

OTHER PUBLICATIONS

Extended European Search Report mailed Aug. 11, 2014.
(Continued)

*Primary Examiner* — Sandra Brase
(74) *Attorney, Agent, or Firm* — Harness, Dickey & Pierce, P.L.C.

(57) ABSTRACT

A gear transmission device includes a drive rotator and a driven external gear. The drive rotator includes a drive internal gear to rotate about a rotary shaft. The driven external gear meshes with the drive internal gear to transmit a drive force to a drive target.

13 Claims, 9 Drawing Sheets

(52) U.S. Cl.
CPC . *G03G 21/1647* (2013.01); *G03G 2221/1657* (2013.01); *Y10T 74/19679* (2015.01)

(56) References Cited

U.S. PATENT DOCUMENTS

| | | | |
|---|---|---|---|
| 5,383,393 | A | 1/1995 | Ueda et al. |
| 5,528,348 | A | 6/1996 | Miwa et al. |
| 5,761,580 | A | 6/1998 | Harada et al. |
| 5,927,148 | A * | 7/1999 | Yamanaka ............ G03G 15/757 74/409 |
| 6,002,897 | A | 12/1999 | Kohno et al. |
| 6,188,857 | B1 | 2/2001 | Yamanaka et al. |
| 6,289,805 | B1 | 9/2001 | Douillard et al. |
| 6,420,807 | B1 | 7/2002 | Tsujimoto et al. |
| 6,671,475 | B2 | 12/2003 | Katada et al. |
| 6,907,212 | B2 | 6/2005 | Harada et al. |
| 6,968,144 | B2 * | 11/2005 | Mizoguchi ................ F16D 1/10 399/167 |
| 9,322,458 | B2 * | 4/2016 | Matsuda .................. F16H 1/10 |
| 2002/0172531 | A1 | 11/2002 | Harada et al. |
| 2007/0003321 | A1 | 1/2007 | Hara et al. |
| 2007/0147884 | A1 * | 6/2007 | Tanaka ............... G03G 21/1846 399/111 |
| 2007/0286640 | A1 * | 12/2007 | Katoh ................ G03G 15/1615 399/121 |
| 2011/0170892 | A1 | 7/2011 | Ishida et al. |
| 2014/0123796 | A1 | 5/2014 | Ishida et al. |

FOREIGN PATENT DOCUMENTS

| | | |
|---|---|---|
| JP | 9-114160 A | 5/1997 |
| JP | H09-222826 A | 8/1997 |
| JP | 11311302 A | 11/1999 |
| JP | 3079189 U | 8/2001 |

OTHER PUBLICATIONS

Office Action for Corresponding Chinese Patent Application No. 201410089890.8 issued on Feb. 3, 2016.
Office Action for Corresponding Japanese Application No. 2013-049190 issued on Nov. 24, 2016.

* cited by examiner

GEAR TRANSMISSION DEVICE, PROCESS UNIT INCLUDING THE GEAR TRANSMISSION DEVICE AND IMAGE FORMING APPARATUS INCLUDING SAME

CROSS-REFERENCE TO RELATED APPLICATIONS

This patent application is a continuation of and claims priority under 35 U.S.C. §§120/121 to U.S. patent application Ser. No. 14/193,343, filed on Feb. 28, 2014, which is based on and claims priority pursuant to 35 U.S.C. §119 to Japanese Patent Application No. 2013-049190, filed on Mar. 12, 2013, in the Japan Patent Office, the entire disclosure of each of which is hereby incorporated by reference herein.

BACKGROUND

Technical Field

Exemplary aspects of the present disclosure generally relate to an image forming apparatus and a gear transmission device including an internal gear, and more particularly to a process unit including the gear transmission device and an image forming apparatus including the process unit.

Description of the Related Art

A gear transmission device for driving a driven rotator such as a development roller or a photosensitive drum in an image forming apparatus has a gear train that is operated in combination of low rotation/high torque drive and high rotation/low torque drive. In the case of the low rotation/high torque drive, the number of teeth (i.e., a pitch circle diameter) of a drive external gear attached to a rotary shaft of a drive motor is set to be small in order to reduce a speed; whereas, the pitch circle diameter of a first-stage driven gear meshing with the drive external gear is set to be relatively large.

However, if the number of gear teeth of the external gear of the drive motor is reduced, an adequate contact ratio between the first-stage driven gear and the external gear cannot be secured, thereby causing irregular rotation, noise, and vibration. Although such noise or vibration can be suppressed to some extent by injecting grease into a mesh portion between gears, it is not enough. Furthermore, injecting grease for multiple times causes a higher risk of foreign substances getting into the mesh portion between the gear teeth, which results in noise, degradation of rotation accuracy, and damage to the gear.

A gear transmission device having a higher contact ratio and reduced noise and vibration is disclosed in, for example, JP-H11-311302-A. In this gear transmission device, a first-stage driven gear meshing with an external gear attached to a rotary shaft of a drive motor is constituted by an internal gear.

Meanwhile, JP-H09-114160-A proposes rotating two or more driven rotators at a predetermined rotational speed ratio in an image forming apparatus. In this image forming apparatus, the rotation of a drive motor disposed on a main body side is transmitted to a development roller and a photosensitive drum in a process unit via a plurality of gears disposed on the process unit side.

At the mesh portion between the gears, fluctuations in rotational speed occur due to flexure of teeth or the like. When the speed fluctuations are large, a toner image to be formed on a photosensitive drum may be influenced, thereby possibly degrading the quality of the image. In view of this, in the image forming apparatus disclosed in JP-H09-114160-A, a plurality of elastic ribs is disposed inside the gears on the process unit side in attempting to reduce the speed fluctuations as much as possible. In order to prevent any mutual influence of speed fluctuations between driven rotators, there has been known a gear transmission device in which two or more drive motors are used so that gear trains in the driven rotators are independent of each other.

Such a gear transmission device is effective in suppressing the speed fluctuations since the contact ratio between the internal gears disclosed, for example, in JP-H11-311302-A, is high. However, when the internal gear train of JP-H11-311302-A is employed in the process unit disclosed, for example, in JP-H09-114160-A, the distance between the shafts of the gears becomes large, and therefore, a large space is required, thereby complicating efforts to reduce the size of the gear transmission device or the process unit.

Alternatively, two drive motors may be disposed on the main body side of the image forming apparatus, and then, a development roller and a photosensitive drum may be rotated via separate gear transmission devices. In this configuration, when the gear transmission device is of an independent type, a load exerted on each of the gears becomes small, thereby suppressing speed fluctuations. In addition, the speed fluctuations are not influenced between driven rotators. However, when the drive motor and the gear transmission device are independently disposed in the driven rotators, it is difficult to reduce space, cost, noise, or vibration.

SUMMARY

In view of the foregoing, in an aspect of this disclosure, initially, there is provided an improved gear transmission device including a drive rotator and a driven external gear. The drive rotator includes a drive internal gear to rotate about a rotary shaft. The driven external gear meshes with the drive internal gear to transmit a drive force to a drive target. The drive internal gear meshes with the driven external gear that transmits the drive force to a drive target, and the rotary shaft of the drive rotator is connected to a rotary shaft of another drive target.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Furthermore, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

Figure 1:
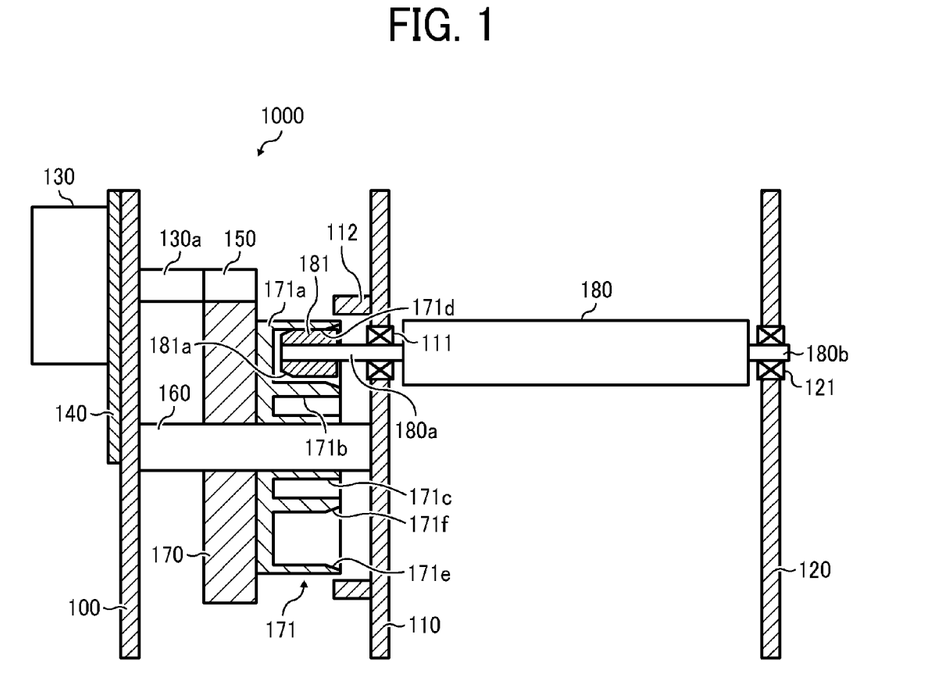
FIG. 1 is a cross-sectional view schematically illustrating a gear transmission device according to a first illustrative embodiment of the present disclosure.

With reference to FIG. 1, a description is provided of an example of a gear transmission device 1000 according to an illustrative embodiment of the present disclosure. Here, the same reference numerals are assigned to the same or corresponding component parts in the drawings, and therefore, a duplicate description will be omitted.

First Embodiment

FIG. 1 shows a gear transmission device 1000 according to a first illustrative embodiment of the present disclosure. As illustrated in FIG. 1, there are disposed three vertical planar frames 100, 110, and 120 that are arranged parallel to each other. A drive motor 130 serving as a driver is attached to the exterior of the frame 100 at the left end via a seat plate 140. A rotary shaft 130a of the drive motor 130 penetrates through the seat plate 140 and the frame 100 in a horizontal direction, and projects toward the intermediate frame 110. A drive external gear 150 is integrally connected to the tip of the rotary shaft 130a. The pitch circle of the drive external gear 150 is set to be small in order to achieve a large deceleration ratio.

The two left and intermediate planar frames 100 and 110 are connected to each other via a support shaft 160 horizontally disposed in the vicinity of the drive motor 130. The rotary shaft 130a of the drive motor 130 is parallel to the support shaft 160. A driven external gear 170 that meshes with the drive external gear 150 is rotatably supported by the support shaft 160. In order to reduce the rotational speed of the drive external gear 150, the pitch circle of the driven external gear 170 is set to be as large as about ten times that of the drive external gear 150.

A drive rotator 171 is integrally formed on one side (i.e., the side of the planar frame 110) of the driven external gear 170. The drive rotator 171 includes, at one side surface thereof, an outer cylinder portion 171a having a slightly smaller diameter than the diameter of the driven external gear 170, an inner cylinder portion 171b, and a boss 171c into which the support shaft 160 is rotatably inserted, in order from the outer diameter side. A drive internal gear 171d is formed on the inner circumference of the outer cylinder portion 171a. Furthermore, tapers 171e and 171f are formed on the inner circumference of an opening end of the outer cylinder portion 171a and the outer periphery of an opening end (i.e., a tip) of the inner cylinder portion 171b, respectively.

A driven rotator 180 as a driven member is horizontally interposed between the intermediate planar frame 110 and the right planar frame 120. The driven rotator 180 is parallel to the rotary shaft 130a of the drive motor 130 and the support shaft 160.

Rotary shafts 180a and 180b formed at right and left ends of the driven rotator 180 in such a manner as to project therefrom are rotatably supported by bearings 111 and 121 disposed in the planar frames 110 and 120, respectively. The left rotary shaft 180a is inserted between the outer cylinder portion 171a and the inner cylinder portion 171b of the drive rotator 171. A driven external gear 181 for transmitting a drive force to the driven rotator 180 is fitted to the rotary shaft 180a. A taper 181a is formed at the tip of the driven external gear 181.

The driven external gear 181 meshes with the drive internal gear 171d of the drive rotator 171. The driven external gear 181 and the drive rotator 171 may be made of proper materials according to usage. In the case of a relatively small torque, the driven external gear 181 and the drive rotator 171 may be made of, for example, a resin. A resin gear can reduce a gear mesh noise.

Furthermore, the driven external gear 181 and the drive internal gear 171d may be helical gears. A helical gear achieves a low vibration, a low noise, high rotational accuracy, and high durability. Furthermore, a helical gear can thrust and urge the driven external gear 181 towards the left in FIG. 1, and can thrust and urge the drive rotator 171 towards the right. Consequently, the drive rotator 171 is urged toward the planar frame 110, thereby minimizing a clearance defined between the drive rotator 171 and an annular rib 112, to be described later, without any additional component parts. Thus, it is possible to effectively prevent a gear mesh noise without increasing the number of component parts.

In this manner, since the driven external gear 181 meshes with the drive internal gear 171d of the drive rotator 171, it is possible to obtain the following advantageous effects: 1) a speed-increasing gear train can be configured in a saved space; 2) the driven rotator 180 including the driven external gear 181 can be readily detached from the drive rotator 171 in an axial direction, thus enhancing the assemblage and disassemblage of the gear transmission device 1000; 3) the drive rotator 171 can increase the contact ratio of the driven external gear 181 so as to reduce the vibration and noise during rotational drive of the driven rotator 180; 4) the increase in the contact ratio can enhance the rotational accuracy and the durability of the drive rotator 171 and the driven external gear 181; 5) the drive rotator 171 can suppress emission of the gear mesh noise; 6) foreign substances biting possibility at a mesh portion between the drive rotator 171 and the driven external gear 181 can be reduced; and 7) grease applied to the mesh portion between the drive rotator 171 and the driven external gear 181 can be prevented from spattering to the outside.

The diameter of the driven external gear 181 is small enough to be inserted just between the outer cylinder portion 171a and the inner cylinder portion 171b. A minimum clearance is defined between the driven external gear 181 and the inner cylinder portion 171b so as to prevent any interference therebetween. The inner cylinder portion 171b has the function of reinforcing the mechanical strength of the drive rotator 171 and the function of restricting an increase in a space around the driven external gear 181 so as to limit the reverberation of the gear mesh noise.

It is to be noted that the above-described tapers 171e and 171f are adapted to smoothly receive the taper 181a formed at the tip of the driven external gear 181 when the driven external gear 181 is inserted between the outer cylinder portion 171a and the inner cylinder portion 171b in order to allow the driven external gear 181 to mesh with the drive internal gear 171d. Here, either the tapers 171e and 171f of the drive rotator 171 or the taper 181a of the driven external gear 181 may smoothly receive the driven external gear 181.

The annular rib 112 is formed at the left side surface of the intermediate planar frame 110 in such a manner as to surround the opening of the outer cylinder portion 171a having the drive internal gear 171d formed thereat. With the annular rib 112, the outer cylinder portion 171a is configured so as to prevent its opening from being exposed to the outside. The annular rib 112 needs not always be continuous in an annular form. The annular rib 112 may be partly cut in an appropriate length in order to replenish grease, or the like to the drive internal gear 171d and the driven external gear 181.

The gear transmission device 1000 according to the present illustrative embodiment is configured as described above. When the drive motor 130 is rotated in the gear transmission device 1000, the drive external gear 150 connected to the rotary shaft 130a rotates the driven external gear 170. The rotation of the driven external gear 170 causes the drive rotator 171 to be rotated. The driven external gear 181 meshing with the drive internal gear 171d of the drive rotator 171 is rotated, so that the driven rotator 180 serving as a driven member is rotated.

The rotational speed of the drive motor 130 is decreased at a stage at which it is transmitted from the drive external gear 150 to the driven external gear 170; whereas, it is increased at a stage at which it is transmitted from the drive rotator 171 to the driven external gear 181. Since the opening of the outer cylinder portion 171a of the drive rotator 171 is covered with the annular rib 112 of the planar frame 110, it is possible to prevent any leakage of the gear mesh noise to the outside or the spattering of the lubricating grease to the outside. The space defined between the outer cylinder portion 171a and the inner cylinder portion 171b is set to the minimum size required for the driven external gear 181, and therefore, the gear mesh noise can be excellently confined, and further, a satisfactory lubrication function can be obtained by a small quantity of the lubricating grease.

Second Embodiment

Figure 2:
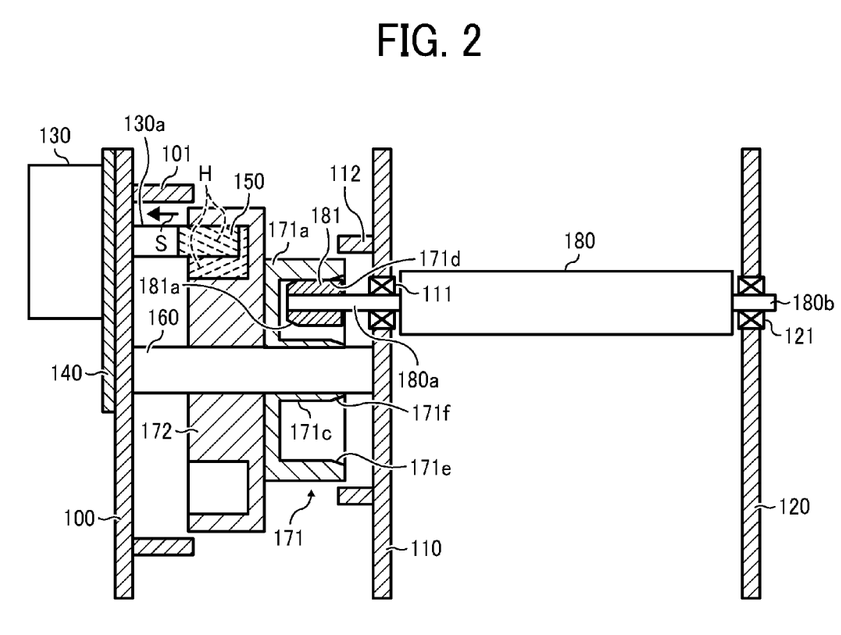
FIG. 2 is a cross-sectional view schematically illustrating a gear transmission device according to a second illustrative embodiment of the present disclosure.

With reference to FIG. 2, a description is provided of a gear transmission device according to a second illustrative embodiment of the present disclosure. FIG. 2 shows the gear transmission device 1000 in the second illustrative embodiment. In the present illustrative embodiment, a gear to be driven by the drive external gear 150 of the drive motor 130 is replaced with a driven internal gear 172, and further, an annular rib 101 is formed at the planar frame 100. Furthermore, in the preset illustrative embodiment, the inner cylinder portion 171b is omitted from the drive rotator 171. The other configuration is basically the same as that shown in FIG. 1.

In the second illustrative embodiment, since the drive external gear 150 is covered with the driven internal gear 172, and an opening formed at the driven internal gear 172 is covered with the annular rib 101 when a drive force is transmitted from the drive external gear 150 to the driven internal gear 172, a structure is achieved in which a mesh noise occurring between the gears hardly leaks outside. Additionally, grease applied to the drive external gear 150 and the driven internal gear 172 can be prevented from spattering therearound.

Consequently, it is possible to enhance silence and cleanness as compared with the gear transmission device of the first illustrative embodiment. Furthermore, the drive external gear 150 and the driven internal gear 172 are configured by helical gears H, thus enhancing silence and durability. In this case, the driven internal gear 172 may be thrust and urged with the inclination of the helical gear in a direction indicated by an arrow S of FIG. 2. Thrusting and urging in this manner can reduce a clearance defined between the annular rib 101 and the driven internal gear 172 so as to further suppress the emission of the mesh noise.

Third Through Eighth Embodiments

With reference to FIGS. 3 through 8, a description is provided of a third through eighth illustrative embodiments of the present disclosure. FIGS. 3 through 8 show embodiments in which a plurality of driven rotators including a first driven rotator 182 corresponding to the driven rotator 180 and a second driven rotator 200 are rotated. In other words, FIGS. 3 through 8 are conceptual views showing a gear transmission device in which at least the first driven rotator 182 and the second driven rotator 200 are driven by a drive internal gear of one drive rotator 271, 371, 471, or 571.

In these six illustrative embodiments, the first driven rotator 182 and the second driven rotator 200 are parallel to each other. The first driven rotator 182 exemplifies a development roller, and the second driven rotator 200 exemplifies a photosensitive drum 200. Description will be made below on the first and second driven rotators exemplifying the development roller 182 and the photosensitive drum 200, respectively. The same subscripts such as a, b, and c following the reference numeral of each of the drive rotators 271, 371, 471, and 571 are assigned to the same or corresponding component parts in the illustrative embodiments, and thus, duplicate description will be appropriately omitted.

A developer housing 210 is formed on the right side surface of the first planar frame 110, and the development roller 182 and the photosensitive drum 200 are rotatably housed inside the developer housing 210. Although the development roller 182 is shown in separation from the photosensitive drum 200 in each of FIGS. 3 through 8, the development roller 182 is actually pressed against the outer peripheral surface of the photosensitive drum 200 under a predetermined pressure by an urging device.

Figure 3:
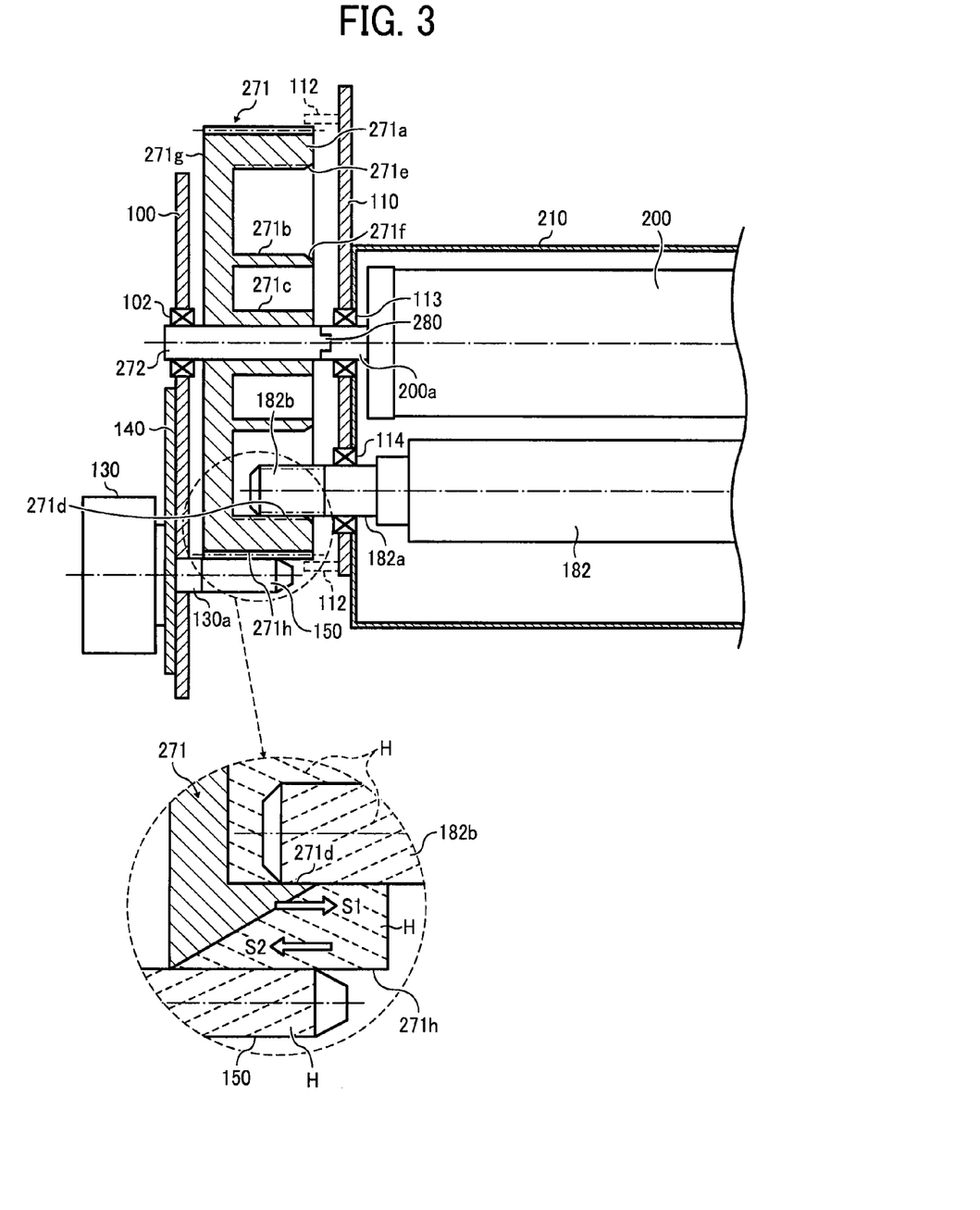
FIG. 3 is a cross-sectional view schematically illustrating a gear transmission device according to a third illustrative embodiment of the present disclosure.
Figure 7:
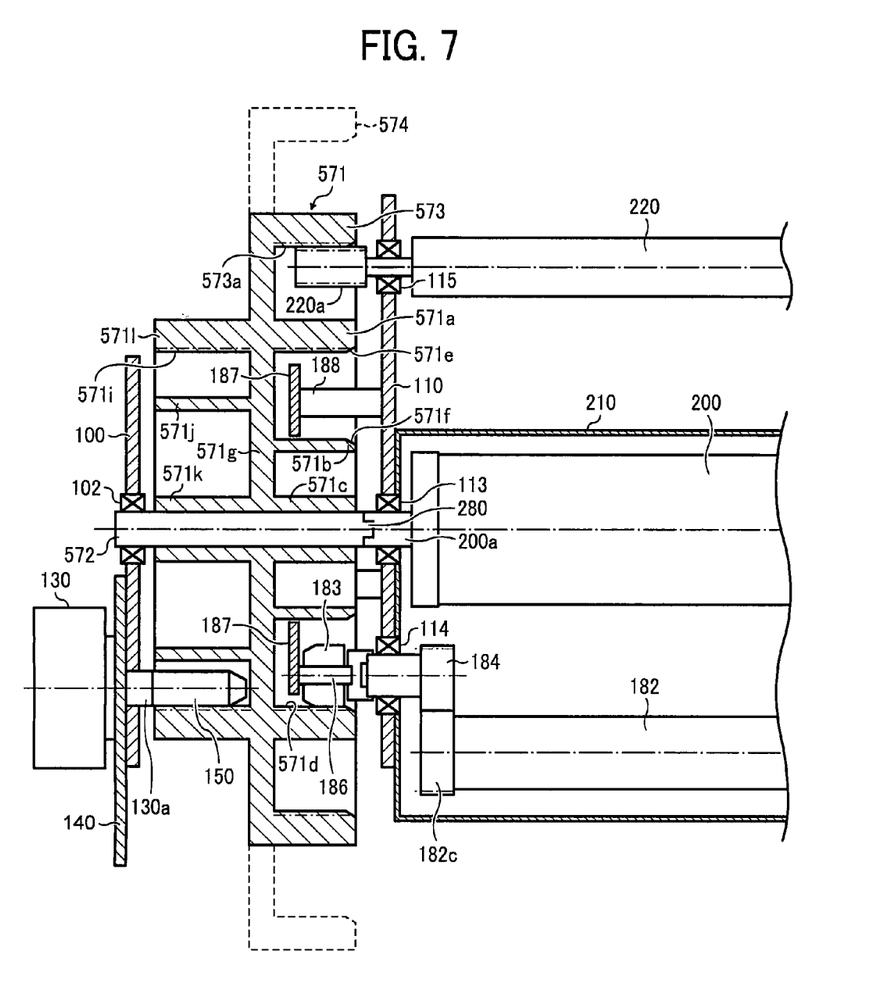
FIG. 7 is a cross-sectional view schematically illustrating a gear transmission device according to a seventh illustrative embodiment of the present disclosure.
Figure 8:
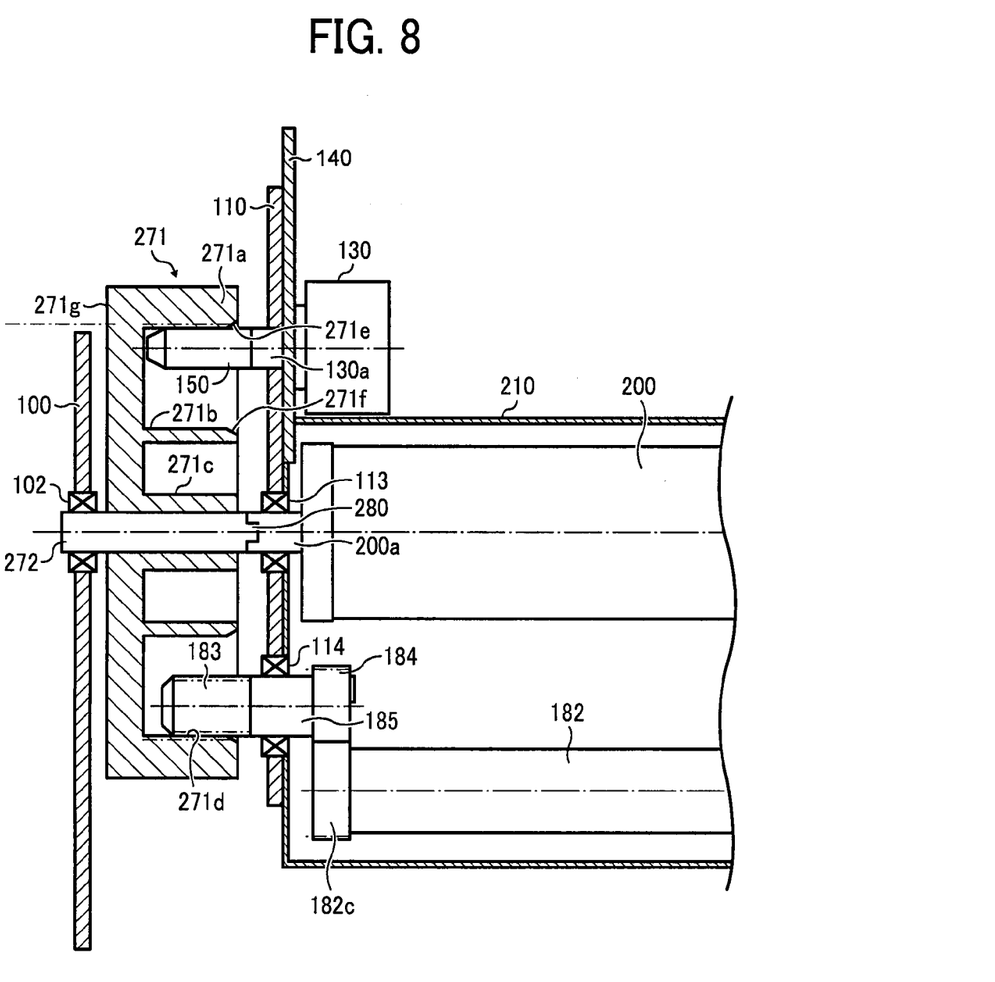
FIG. 8 is a cross-sectional view schematically illustrating a gear transmission device according to an eighth illustrative embodiment of the present disclosure.

In the third illustrative embodiment shown in FIG. 3 to the eighth illustrative embodiment shown in FIG. 8, the development roller 182 and the photosensitive drum 200 that are drive targets to be driven are driven in different manners. The configuration of the drive internal gear is different according to the drive manner. The right planar frame 120 shown in FIGS. 1 and 2 are omitted in FIGS. 3 through 8.

Third Embodiment

FIG. 3 shows the gear transmission device according to a third illustrative embodiment of the present disclosure. The drive rotator 271 is interposed between the planar frames 100 and 110 in such a state as to be rotatably pivoted by bearings 102 and 113 disposed in the planar frames 100 and 110, respectively. The drive rotator 271 includes, at one side surface of a circular end plate 271g, an outer cylinder portion 271a, an inner cylinder portion 271b, and a boss 271c integrated with a rotary shaft 272. A driven external gear 271h is formed at the outer periphery of the outer cylinder portion 271a. A drive internal gear 271d is formed at the inner circumference. Furthermore, tapers 271e and 271f are formed at the inner circumference of an opening end of the outer cylinder portion 271a and the outer periphery of an opening end (i.e., a tip) of the inner cylinder portion 271b, respectively.

The driven external gear 271h at the outer periphery of the outer cylinder portion 271a meshes with the drive external gear 150 disposed on the drive motor 130. Meanwhile, a bearing 114 is disposed at the planar frame 110. A rotary shaft 182a disposed at one end of the development roller 182 is rotatably supported by the bearing 114. A driven external gear 182b for transmitting a drive force to a development roller 182 is formed at the outer periphery at the tip of the rotary shaft 182a projecting from the bearing 114 toward the outside. The driven external gear 182b meshes with the drive internal gear 271d of the drive rotator 271. The rotation of the drive rotator 271 causes the development roller 182 to be rotated. Here, the annular rib 112 may be formed at the planar frame 110, as required.

The rotary shaft 272 of the drive rotator 271 is connected to a rotary shaft 200a of the photosensitive drum 200 via a coupling 280 formed of an elastic body. The coupling 280 transmits a rotating force from one rotary shaft 272 on the drive side to the other rotary shaft 200a on the driven side with a projection-recess engagement structure. The coupling 280 is designed to shield vibration from the drive rotator 271 to the photosensitive drum 200. Here, the coupling 280 has a projection that is formed at the shaft end of the rotary shaft 272 on the side of the drive rotator 271 and a recess that is formed at the shaft end of the rotary shaft 200a on the side of the photosensitive drum 200.

Owing to the coupling 280, the photosensitive drum 200 is rotated at the same rotational speed as that of the drive rotator 271 in synchronization with the rotation of the drive rotator 271. In this configuration, the development roller 182 and the photosensitive drum 200 are rotated by the common drive rotator 271 at a predetermined rotational speed ratio. It is, of course, possible to interpose a transmission mechanism configured by gears and the like between the rotary shaft 272 of the drive rotator 271 and the rotary shaft 200a of the photosensitive drum 200.

The emission of a mesh noise is more effectively suppressed when a clearance defined between the drive rotator 271 and the planar frame 110 is as narrow as possible. In view of this, as shown in enlargement in FIG. 3, the drive internal gear 271d and the driven external gear 182b may be configured by helical gears, and then, the drive rotator 271 may be thrust and urged in a direction indicated by an arrow S1. Accordingly, it is possible to reduce a clearance defined between the drive rotator 271 and the annular rib 112, so as to suppress the emission of the gear mesh noise.

Not the drive internal gear 271d and the driven external gear 182b but the drive external gear 150 and the driven external gear 271h may be configured by helical gears. Alternatively, both of the drive internal gear 271d and the driven external gear 182b and the drive external gear 150 and the driven external gear 271h may be constituted by helical gears H. In this case, the drive rotator 271 is thrust and urged at the equal strength in directions indicated by arrows S1 and S2 opposite to each other, so that the drive rotator 271 can be neutrally held in an axial direction, thus reducing friction or abrasion at the bearings 102 and 113.

The gear transmission device 1000 shown in FIG. 3 has only two gear mesh portions, and further, the drive internal gear 271d of the drive rotator 271 meshes with the driven external gear 182b, thus achieving a saved space, a reduced cost, a reduced noise, and high rotational accuracy. Furthermore, with the coupling 280, the photosensitive drum 200 can be excellently disposed in the gear transmission device 1000.

In summary, since the driven external gear 182b meshes with the drive internal gear 271d of the drive rotator 271 in the gear transmission device 1000 shown in FIG. 3, it is possible to obtain the following advantageous effects: 1) a speed-increasing gear train can be configured in a saved space; 2) the development roller 182 and the photosensitive drum 200 can be readily detached from the drive internal gear 271d in the axial direction, thus enhancing the assemblage and disassemblage of the gear transmission device 1000; 3) the drive internal gear 271d can increase the contact ratio of the driven external gear 182b so as to reduce the vibration and noise during rotational driving of the development roller 182; 4) the increase in the contact ratio can enhance the rotational accuracy and durability of the drive internal gear 271*d* and the driven external gear 182*b*; 5) the drive internal gear 271*d* can suppress the emission of the gear mesh noise; 6) the foreign substance biting possibility at a mesh portion between the drive internal gear 271*d* and the driven external gear 182*b* can be reduced; and 7) grease applied to the mesh portion between the drive internal gear 271*d* and the driven external gear 182*b* can be prevented from spattering to the outside.

Fourth Embodiment

Figure 4:
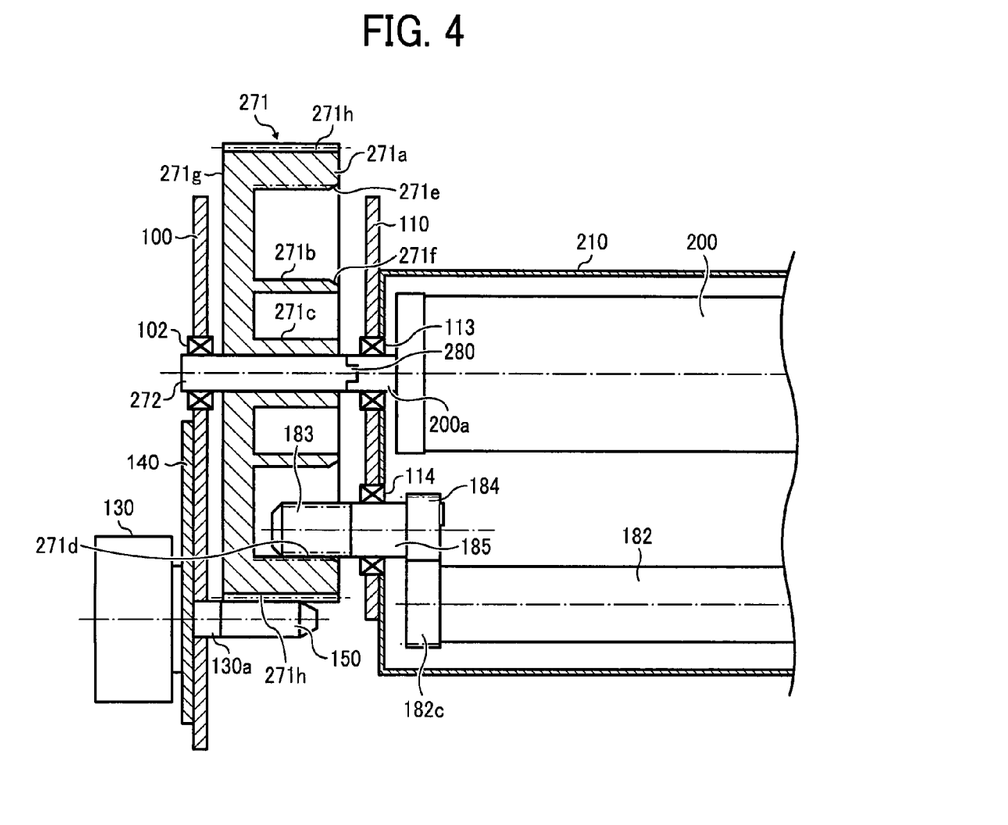
FIG. 4 is a cross-sectional view schematically illustrating a gear transmission device according to a fourth illustrative embodiment of the present disclosure.

With reference to FIG. 4, a description is provided of a gear transmission device according to a fourth illustrative embodiment of the present disclosure. In the fourth illustrative embodiment, the development roller 182 is rotated via intermediate gears 183 and 184. The other configuration is the same as that of the third illustrative embodiment shown in FIG. 3. The intermediate gears 183 and 184 are mere examples, and may be, of course, replaced with other transmission mechanisms. The intermediate gears 183 and 184 are integrally connected to each other via a rotary shaft 185. The rotary shaft 185 is rotatably supported by the bearing 114. The intermediate gear 183 on the motor side meshes with the drive internal gear 271*d*. The intermediate gear 184 on the side of the development roller 182 meshes with a driven external gear 182*c* attached to the end of the development roller 182.

When a drive motor 130 is rotated in the fourth illustrative embodiment, the drive external gear 150 fitted to the rotary shaft 130*a* rotates the drive rotator 271. When the drive rotator 271 is rotated, the photosensitive drum 200 is rotated via a coupling 280. Furthermore, the development roller 182 is rotated via the intermediate gear 183, the rotary shaft 185, the intermediate gear 184, and the driven external gear 182*c* simultaneously with the rotation of the photosensitive drum 200. In this manner, the development roller 182 and the photosensitive drum 200 are rotated at a predetermined rotational speed by the common drive rotator 271. Since the development roller 182 is rotated via the intermediate gears 183 and 184 in the fourth illustrative embodiment, the rotational speed of the development roller 182 can be set with an enhanced degree of freedom according to the number of teeth of the intermediate gears 183 and 184, the pitch circle diameter, or the like.

Fifth Embodiment

Figure 5:
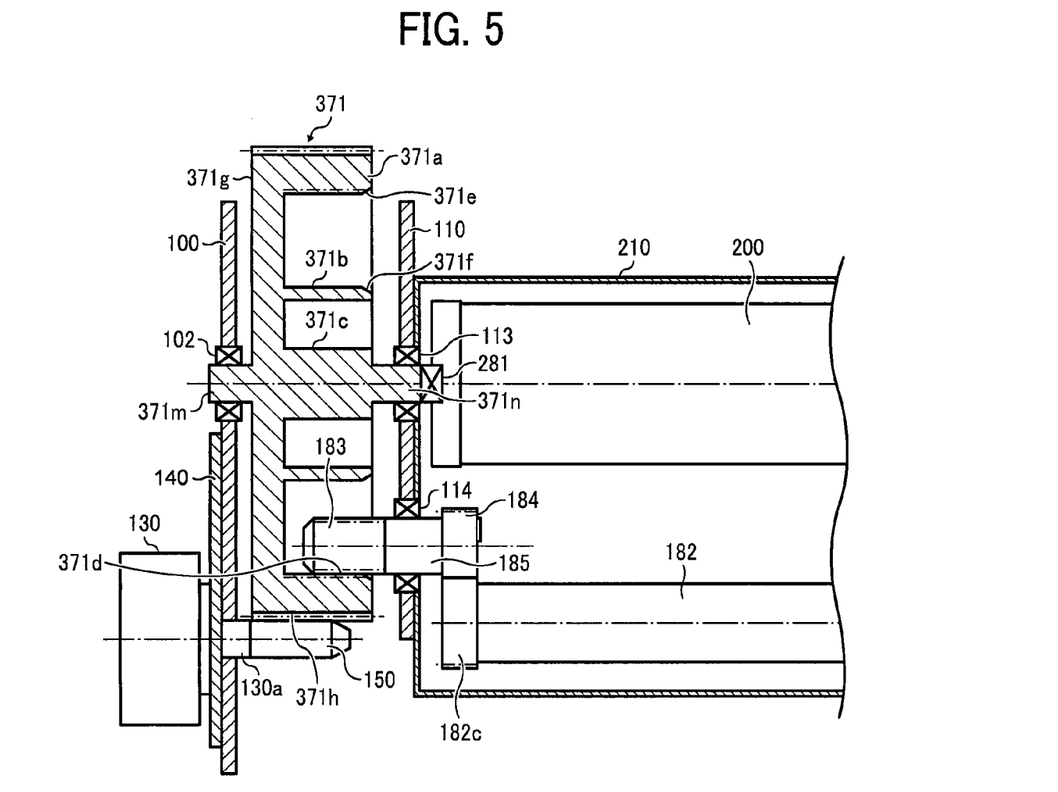
FIG. 5 is a cross-sectional view schematically illustrating a gear transmission device according to a fifth illustrative embodiment of the present disclosure.

With reference to FIG. 5, a description is provided of a gear transmission device according to a fifth illustrative embodiment of the present disclosure. FIG. 5 shows the gear transmission device 1000 according to the fifth illustrative embodiment of the present disclosure. Rotary shafts 371*m* and 371*n* projecting from both sides of the drive rotator 371 are molded integrally with the main body of the drive rotator 371, and further, a coupling 281 is integrated at the tip of the rotary shaft 371*n*. The other configuration is the same as that in the fourth illustrative embodiment shown in FIG. 4. The drive rotator 371 having the integrated coupling 281 in this manner can reduce the number of component parts so as to reduce cost and enhance dimensional accuracy. If the coupling 281 and the drive rotator 371 constitute independent members, component parts are piled up, thereby possibly degrading the dimensional accuracy.

Sixth Embodiment

Figure 6:
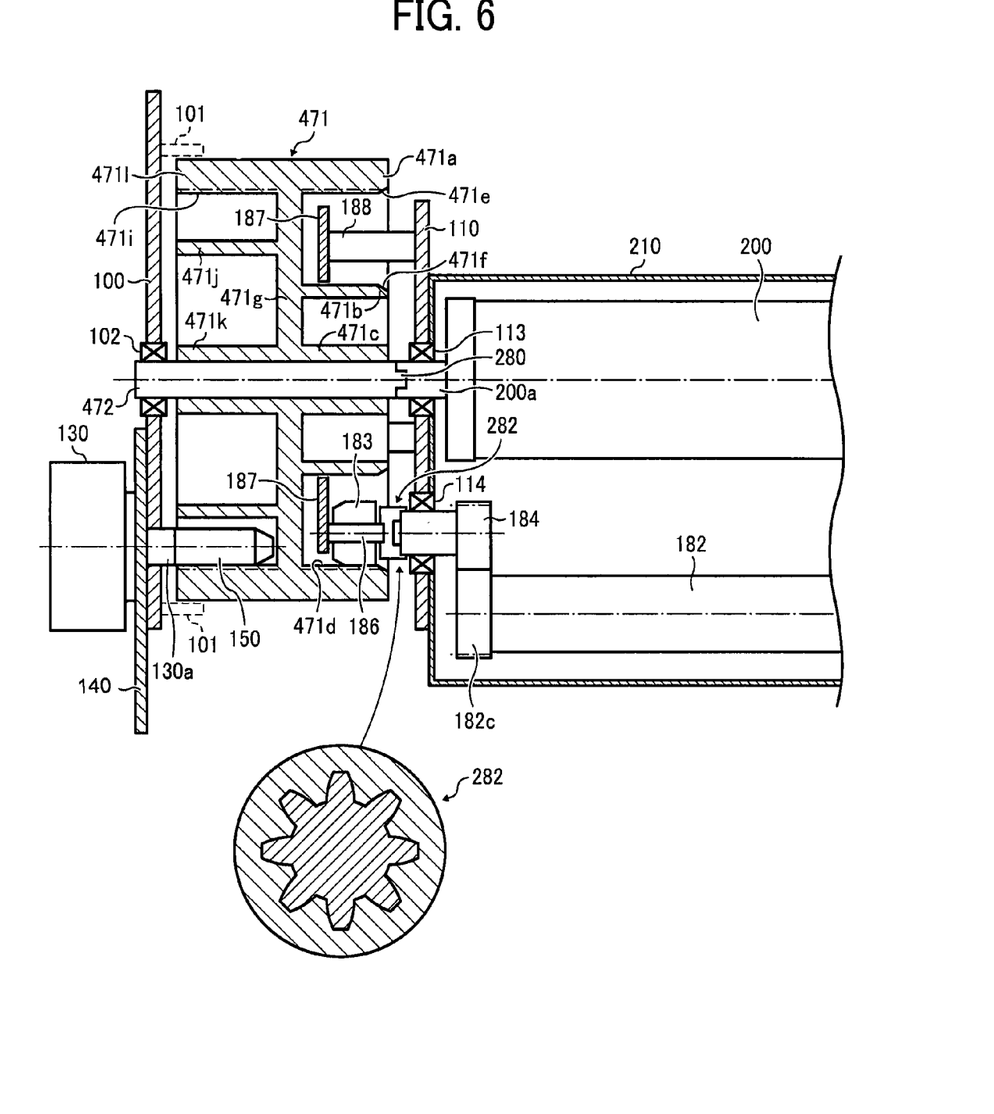
FIG. 6 is a cross-sectional view schematically illustrating a gear transmission device according to a sixth illustrative embodiment of the present disclosure.

With reference to FIG. 6, a description is provided of a gear transmission device according to a sixth illustrative embodiment of the present disclosure. In FIG. 6, a driven internal gear 471*i* having substantially the same diameter as that of a drive internal gear 471*d* transmits a drive force from the drive external gear 150 of the drive motor 130 and the drive rotator 471. Furthermore, the intermediate gear 183 is rotatably supported by the support shaft 186, and connected to the intermediate gear 184 opposite to the intermediate gear 183 via a coupling 282, so that the coupling 282 is rotatably supported on the outer periphery thereof by a bearing 114. The coupling 282 is of an involute spline type shown in cross section.

More specifically, an outer cylinder portion 471*l* serving as a second cylinder, an inner cylinder portion 471*j*, and a boss 471*k* are formed on a side opposite to an end plate 471*g* of the drive rotator 471. The outer cylinder portion 471*l* has substantially the same or similar diameter as that of an outer cylinder portion 471*a* on the opposite side. The boss 471*k* is continuous to a boss 471*c* on the opposite side, and a rotary shaft 472 is integrally fitted thereinto.

The inner cylinder portion 471*j* has a larger diameter than that of an inner cylinder portion 471*b* on the opposite side, and an annular space is defined between the inner cylinder portion 471*j* and the outer cylinder portion 471*l*. The driven internal gear 471*i* is formed on the inner circumference of the outer cylinder portion 471*l*. The drive external gear 150 connected to the rotary shaft 130*a* of the drive motor 130 meshes with the driven internal gear 471*i*.

The support shaft 186 rotatably supporting the intermediate gear 183 is supported by an annular planar support member 187 disposed in the annular space defined between the outer cylinder portion 471*a* and the inner cylinder portion 471*b* in the drive rotator 471. The support member 187 is supported by a plurality of stays 188 horizontally extending from the first planar frame 110.

The above-described two intermediate gears 183 and 184 shown in FIGS. 4 and 5 are supported at both ends of the rotary shaft 185, so that the rotary shaft 185 connecting both of the intermediate gears 183 and 184 to each other can be supported by the bearing 114. However, since one intermediate gear 183 and the other intermediate gear 184 are connected to each other via the coupling 282 in the illustrative embodiment shown in FIG. 6, the gear transmission device 1000 shown in FIG. 6 cannot adopt the intermediate gear supporting structure shown in FIGS. 4 and 5.

Hence, the intermediate gear 183 is rotatably fixed to the support shaft 186 supported by the planar frame 110 via the support member 187 and the stays 188, and thus, the drive force is transmitted from the intermediate gear 183 to the intermediate gear 184 on the opposite side via the coupling 282. The coupling 282 is rotatably supported on the outer periphery thereof by the bearing 114, as described above. The other configuration is the same as that in the fourth illustrative embodiment shown in FIG. 4.

In the sixth illustrative embodiment, since the internal gears 471*e* and 471*i* are formed on the right and left of the drive rotator 471, the width of the drive rotator 471 somewhat becomes larger. However, with the transmission by the internal gears 471*e* and 471*i*, the drive motor 130 can be prevented from projecting outward in a radial direction with reference to the rotary shaft 472 of the drive rotator 471.

Furthermore, since the drive external gear 150 of the drive motor 130 meshes with the internal gear 471*i*, the outer cylinder portion 471*l* can suppress a mesh noise from being discharged to the outside from the mesh portion. As the clearance defined between the drive rotator 471 and the planar frame 100 becomes narrower, the emission of the mesh noise can be more effectively suppressed. In view of this, according to the present illustrative embodiment, the drive external gear 150 and the driven internal gear 471*i* are formed by helical gears, so that a thrust force produced by the mesh between the helical gears thrusts and urges the drive rotator 471 toward the planar frame 100. As required, the annular rib 101 is formed at the planar frame 100.

Additionally, the support shaft 186 of the intermediate gear 183 is supported by the support member 187, and therefore, the mesh between the gears becomes stable, thereby reducing the mesh noise and prolonging a gear lifetime. With the coupling 282, the mesh vibration produced between the intermediate gear 183 and the drive internal gear 471*d* can be suppressed from being transmitted to the development roller 182.

Seventh Embodiment

With reference to FIG. 7, a description is provided of a gear transmission device according to a seventh illustrative embodiment. FIG. 7 shows a gear transmission device according to the seventh illustrative embodiment of the present disclosure. The drive rotator 571 in the seventh illustrative embodiment includes an additional cylinder 573 around the drive rotator 471 shown in FIG. 6. The additional cylinder 573 is employed to rotate an arbitrary driven rotator 220 disposed outside the housing 210 by the drive rotator 571. Although only one additional cylinder 573 is disposed in the present illustrative embodiment shown in FIG. 7, a plurality of additional cylinders 574 may be concentrically disposed on a rotary shaft 572 of the drive rotator 571.

The driven rotator 220 is rotatably supported by a bearing 115 of the planar frame 110. A driven external gear 220*a* fixed to one end of the rotary shaft of the driven rotator 220 meshes with a drive internal gear 573*a* formed on the inner circumference of the additional cylinder 573.

With this configuration, with the multiple additional cylinders 574, the plurality of third driven rotators 220 can be driven at a predetermined rotational speed ratio by only one drive rotator 571 with respect to the development roller 182 and the photosensitive drum 200. The other configuration is substantially the same as that in the sixth illustrative embodiment shown in FIG. 6.

Eighth Embodiment

With reference to FIG. 8, a description is provided of an eighth illustrative embodiment of the present disclosure. In the eighth illustrative embodiment, the drive motor 130 in the gear transmission device 1000 according to the fourth illustrative embodiment shown in FIG. 4 is disposed not in the left planar frame 100 but in the right planar frame 110. The drive external gear 150 of the drive motor 130 meshes with the drive internal gear 271*d* of the rotator 271. The drive internal gear 271*d* serves as a driven gear on a side on which it meshes with the drive external gear 150 of the drive motor 130. In other words, the drive internal gear 271*d* is also used as a drive input. No driven external gear 271*h* is formed on the outer periphery of the outer cylinder portion 271*a*.

The drive external gear 150 and the intermediate gear 183 mesh with the common drive internal gear 271*d*, so that no gear projects outward, thereby effectively suppressing the emission of a gear mesh noise as compared with the gear transmission device 1000 shown in FIG. 4. Furthermore, the contact ratio of the drive external gear 150 of the drive motor 130 is increased, thus reducing vibration and/or noise produced at the time of rotational drive of the development roller 182 and the photosensitive drum 200, enhancing the rotational accuracy and durability of the rotator 271, and reducing foreign substances biting possibility at a mesh portion between the drive external gear 150 and the drive internal gear 271*d*. Additionally, it is possible to prevent grease applied to the mesh portion from spattering to the outside. Furthermore, the drive motor 130 does not project in a vertical direction as compared with the case shown in FIG. 4, thus achieving the gear transmission device 1000 in a saved space.

[Image Forming Apparatus]

Figure 9:
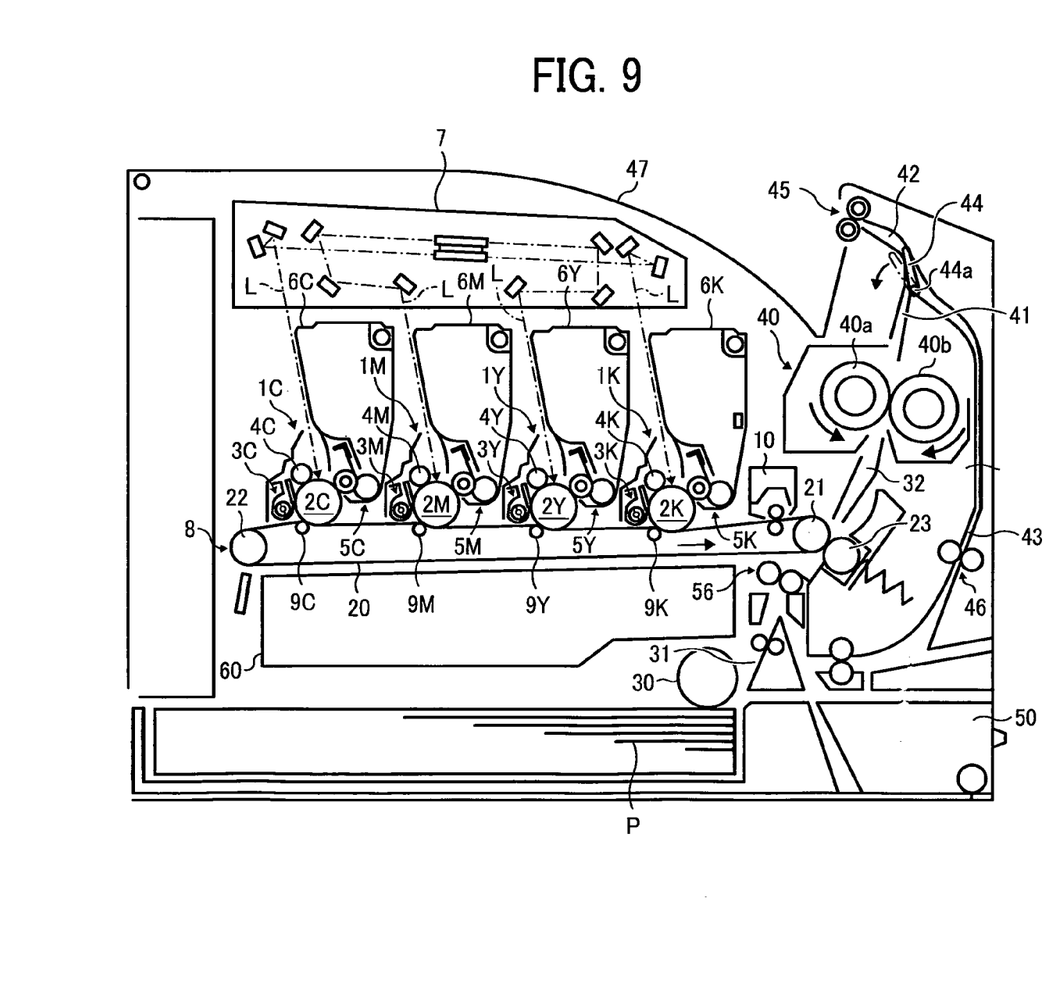
FIG. 9 is a cross-sectional view schematically illustrating an image forming apparatus equipped with the gear transmission device according to an illustrative embodiment of the present disclosure.

The above-described gear transmission devices shown in FIGS. 1 through 8 can be adopted in various kinds of drive mechanisms. Here, the gear transmission devices are applied to an image forming apparatus shown in FIG. 9, for example. FIG. 9 shows a laser printer as an example of the image forming apparatus, to which the gear transmission device 1000 according to the present disclosure is applied. In this image forming apparatus, at least any one of process units 1K, 1Y, 1M, and 1C, photosensitive drums 2K, 2Y, 2M, and 2C, development rollers of developing devices 5K, 5Y, 5M, and 5C, an intermediate transfer belt 20, a sheet feed roller 30 serving as a sheet conveyance roller, and a fixing roller 40*a* of a fixing device 40 is designed to be driven by the above-described gear transmission device 1000.

Here, "the sheet conveyance roller" according to the present disclosure encompasses all rollers relevant to sheet conveyance such as a timing roller pair 56, a sheet output roller pair 45, and a reverse conveyance roller pair 46 in addition to the sheet feed roller 30.

FIG. 9 is a perspective view schematically illustrating the outside appearance of a laser printer. The image forming apparatus, to which a sheet conveyance device according to the illustrative embodiment is applied, may be singly a copying machine, a printer, and a facsimile machine, or a composite machine including two or more of the above devices in combination.

The image forming apparatus is provided with the four process units 1K, 1Y, 1M, and 1C serving as image forming units for forming an image with development agents of black, yellow, magenta, and cyan colors corresponding to color separation components of a color image. The process units 1K, 1Y, 1M, and 1C include toner bottles 6K, 6Y, 6M, and 6C containing toners of different colors that are not yet used, respectively. Other than that, the process units 1K, 1Y, 1M, and 1C have the same configuration. It is to be noted that the suffixes K, Y, M, and C denote colors black, yellow, magenta, and cyan, respectively, and these suffixes are omitted, unless discrimination of the colors is necessary. Taking one process unit 1K as an example, a configuration thereof will be described below. The process unit 1K includes the photosensitive drum 2K (i.e., the photosensitive drum), a drum cleaning device 3K, a charging device 4K, the developing device 5K, and so forth. The process unit 1K is detachably attached to the main body of the image forming apparatus. Such a consumable component part can be replaced with a new one at one time.

An exposure device 7 is disposed above each of the process units 1K, 1Y, 1M, and 1C. The exposure device 7 projects a laser beam from a laser diode based on image data.

A transfer device 8 serving as a first transfer unit is disposed below each of the process units 1K, 1Y, 1M, and 1C. The transfer device 8 includes four primary transfer rollers 9K, 9Y, 9M, and 9C facing the photosensitive drums 2K, 2Y, 2M, and 2C, respectively, the intermediate transfer belt 20, a drive roller 21, and a driven roller 22, a secondary transfer roller 23, and a belt cleaning device 10. The intermediate transfer belt 20 is formed into an endless loop, entrained around and stretched across the primary transfer rollers 9K, 9Y, 9M, and 9C, the drive roller 21, and the driven roller 22 so as to move in a certain direction. The secondary transfer roller 23 serves as a secondary transfer device facing the drive roller 21. Assuming that the photosensitive drums 2K, 2Y, 2M, and 2C are first photosensitive members for the respective colors, the intermediate transfer belt 20 is a second photosensitive member, on which the images of the first photosensitive members are composited with each other.

In the lower section of the image forming apparatus, there are provided a sheet feed tray 50, on which multiple recording sheets P can be stacked, and the sheet feed roller 30 for feeding the sheet P from the sheet feed tray 50 toward a sheet feed path 31. The timing roller pair 56 for temporarily stopping the sheet is disposed near the end of the sheet feed path 31.

The timing roller pair 56 is disposed near the intermediate transfer belt 20 at the upstream side in the conveyance direction of the recording sheet P. The timing roller pair 56 stops temporarily the recording sheet P to make it slack so as to align with a toner image on the intermediate transfer belt 20. Immediately before the toner image formed on the intermediate transfer belt 20 is transferred onto the recording sheet P at a secondary transfer nip, the timing roller pair 56 feeds the recording sheet P to the secondary transfer nip at a predetermined timing.

A post-transfer sheet passage 32 after the transfer is formed above the nip defined by the secondary transfer roller 23 and the drive roller 21. The fixing device 40 as a fixing section is disposed near the end of the post-transfer sheet passage 32. The fixing device 40 includes the fixing roller 40a incorporating therein a heat generating source such as a halogen lamp and a pressing roller 40b that pressingly contacts against the fixing roller 40a under a predetermined pressure while being rotated.

A post-fixation conveyance path 41 after fixing process is disposed at the upper portion of the fixing device 40. The post-fixation conveyance path 41 is branched at the end thereof into a sheet output path 42 and a reverse conveyance path 43. A switch member 44 that is pivotally driven on a pivotal shaft 44a is disposed on the side of the post-fixation conveyance path 41. The sheet output roller pair 45 is disposed at the end of the sheet output path 42. The reverse conveyance path 43 merges at the end thereof with the sheet feed path 31. The reverse conveyance roller pair 46 is disposed in the middle of the reverse conveyance path 43. Furthermore, a sheet output tray 47 obtained by recessing an upper cover inward is disposed at the upper portion of the image forming apparatus.

A powder container 60 (i.e., a toner container) containing a waste toner therein is disposed between the transfer device 8 and the sheet feed tray 50. The powder container 60 is detachably attached to the main body of the image forming apparatus.

Next, a description will be provided of the basic operation of the image forming apparatus. When the sheet feed roller 30 is rotated in response to a sheet feed signal output from a controller in the image forming apparatus, only an uppermost sheet of the recording sheets P stacked on the sheet feed tray 50 is separated to be fed onto the sheet feed path 31. When the leading end of the recording sheet P reaches a nip of the timing roller pair 56, the recording sheet P stands by with slack formed thereat in order to take timing (synchronism) with the toner image to be formed on the intermediate transfer belt 20 and to correct skewing at leading end of the recording sheet P.

A description is provided of an image forming operation using the process unit 1 as an example of the image forming operation of the process units. First, the surface of the photosensitive drum 2K is electrically charged to a uniform high potential at the electric charging device 4K. First, the surface of the photosensitive drum 2K is electrically charged to a uniform high potential at the electric charging device 4K. The surface of the photosensitive drum 2K is illuminated with a laser beam L by the exposure device 7 based on image data. Then, a portion illuminated with the laser beam L is reduced in potential, thus forming an electrostatic latent image. An unused black toner is supplied from the toner bottle 6K to the developing device 5K.

The toner is transferred onto the surface portion of the photosensitive drum 2K where the electrostatic latent image is formed by the developing device 5K, and thus, a black toner image is formed (developed). The toner image formed on the photosensitive drum 2K is transferred onto the intermediate transfer belt 20.

The drum cleaning device 3K removes a residual toner adhering to the photosensitive drum 2K through an intermediate transfer process. The removed residual toner is fed to a waste toner container housed inside the process unit 1K by a waste toner conveyor, and then, is recycled in the waste toner conveyor. Furthermore, a static eliminating device statically eliminates electric charges remaining on the photosensitive drum 2K after cleaning.

Toner images are formed on the photosensitive drums 2Y, 2M, and 2C in the same manner in the process units 1Y, 1M, and 1C, respectively, and thus, the respective toner images of the colors are transferred onto the intermediate transfer belt 20 to be superimposed on one another.

When the respective toner images of the colors are transferred onto the intermediate transfer belt 20 so as to be superimposed on one another, thus forming a composite toner image, the timing roller pair 56 and the sheet feed roller 30 are started to be driven. The recording sheet P is fed to the secondary transfer roller 23 in timing (synchronism) with the composite toner image transferred onto the intermediate transfer belt 20. The composite toner image formed on the intermediate transfer belt 20 is transferred onto the fed recording sheet P at the secondary transfer nip of the secondary transfer roller 23. The composite toner image formed on the intermediate transfer belt 20 is transferred onto the fed recording sheet P at the secondary transfer nip of the secondary transfer roller 23.

The recording sheet P bearing the composite toner image transferred thereon is conveyed to the fixing device 40 through the post-transfer sheet passage 32 after the transfer. The recording sheet P that has been fed into the fixing device 40 is nipped between the fixing roller 40a and the pressing roller 40b, and the toner image that is not yet fixed are heated and pressed, to be thus fixed onto the recording sheet P. The recording sheet P having the composite toner image fixed thereon is fed from the fixing device 40 to the post-fixation conveyance path 41 after fixing process.

The switch member 44 is located at a position indicated by a solid line in FIG. 9 at the timing in which the recording sheet P is fed from the fixing device 40, and therefore, the post-fixation conveyance path 41 after fixing process is opened around the end thereof. The recording sheet P fed from the fixing device 40 passes the post-fixation conveyance path 41 after fixing process, and thereafter, is nipped by the sheet output roller pair 45, to be thus output onto the sheet output tray 47.

In the case of double-sided printing, when the rear end of the recording sheet P to be conveyed by the sheet output roller pair 45 passes the post-fixation conveyance path 41 after fixing process, the switch member 44 is pivotally moved to a position indicated by a broken line in FIG. 9, and therefore, the post-fixation conveyance path 41 after fixing process is closed around the end thereof. At substantially the same time, the sheet output roller pair 45 is reversely rotated, so that the recording sheet P is reversely conveyed onto the reverse conveyance path 43.

The recording sheet P conveyed on the reverse conveyance path 43 reaches the timing roller pair 56 through the reverse conveyance roller pair 46, and then, is fed out in appropriate timing such that toner images for the second side formed on the intermediate transfer belt 20 are aligned with the recording sheet P. When the recording sheet P passes the secondary transfer roller 23, the toner images are transferred onto the second side or back side of the recording sheet P. The toner images on the back side are fixed onto the recording sheet P in the fixing device 40, and thereafter, the recording sheet P is output onto the sheet output tray 47 through the post-fixation conveyance path 41, the sheet output path 42, and the sheet output roller pair 45 in order.

Furthermore, after the toner images on the intermediate transfer belt 20 are transferred onto the recording sheet P, the residual toner adheres onto the intermediate transfer belt 20. The residual toner is removed from the intermediate transfer belt 20 by the belt cleaning device 10. The toner removed from the intermediate transfer belt 20 is recycled into the powder container 60 by a waste toner conveyor.

According to the illustrative embodiments of the present disclosure as described above, there is provided an improved gear transmission device including a drive rotator and a driven external gear. The drive rotator includes a drive internal gear to rotate about a rotary shaft. The driven external gear meshes with the drive internal gear to transmit a drive force to a drive target. The drive internal gear meshes with the driven external gear that transmits the drive force to a first drive target, and the rotary shaft of the drive rotator is connected to a rotary shaft of a second drive target.

In the gear transmission device according to the present disclosure, the driven external gear for transmitting the drive force to the driven rotator meshes with the drive internal gear, thus increasing a gear contact ratio as compared with a drive external gear. Furthermore, a gear mesh noise is confined inside the drive internal gear, to be thus hardly discharged to the outside. With this configuration, it is possible to reduce vibration and/or noise during rotational drive of the driven rotator.

Furthermore, since the driven external gear is located inside the drive internal gear, a shaft distance between a drive side and a driven side can be reduced, thus providing a gear transmission device requiring smaller space. Still further, it is possible to prevent foreign substances from getting into a gear mesh portion from the outside, so as to prevent abnormal noise, to maintain rotational accuracy, and to enhance durability.

With the gear transmission device according to the present disclosure, the rotary shaft of the second driven rotator is connected to the rotary shaft of the drive rotator, thus rotating two driven rotators in a smaller space with low noise and low vibration.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:
1. A gear transmission device
a drive source having a rotary shaft with a gear;
    a drive rotator to transmit a drive force from the drive source to a first driven rotator, the drive rotator including an internal gear on an inner circumferential surface of the drive rotator; and
    a driven external gear to transmit the drive force from the drive rotator to the first driven rotator,
    the gear directly meshing with the internal gear,
    the driven external gear meshing with the internal gear.

2. The gear transmission device according to claim 1, wherein a rotary shaft of the drive rotator is connected to a rotary shaft of a second driven rotator.

3. The gear transmission device according to claim 2, wherein at least one of the first driven rotator and the second driven rotator is connected to and driven by the drive source via a coupling.

4. The gear transmission device according to claim 2, wherein the rotary shaft of the drive rotator is connected to the rotary shaft of the second driven rotator via a coupling.

5. The gear transmission device according to claim 1, wherein the internal gear of the drive rotator is a single internal gear, wherein the gear meshes with the single internal gear, and wherein the driven external gear meshes with the single internal gear.

6. The gear transmission device according to claim 5, wherein the drive source is disposed at the same side as the first driven rotator relative to the drive rotator.

7. The gear transmission device according to claim 1, wherein the internal gear of the drive rotator includes:
    a driven internal gear directly meshing the gear; and
    a drive internal gear meshing with the driven external gear.

8. The gear transmission device according to claim 7, wherein the drive source and the first driven rotator are disposed at opposite sides relative to the drive rotator.

9. The gear transmission device according to claim 7, further comprising:
    a first rib disposed adjacent to an open side of the driven internal gear; and
    a second rib disposed adjacent to an open side of the drive internal gear.

10. The gear transmission device according to claim 1, further comprising a rib disposed adjacent to an open side of the internal gear of the drive rotator.

11. The gear transmission device according to claim 1, wherein each of the internal gear, the gear, and the driven external gear is a helical gear having inclined teeth.

12. An image forming apparatus comprising the gear transmission device according to claim 11.

13. A drive transmission device comprising:
   a drive source including a rotary shaft and with a gear; and
   a drive rotator to transmit a drive force from the drive source to a driven rotator, the drive rotator including a driven external gear at an outer circumference of the drive rotator, the driven external gear meshing with the gear, and the drive rotator including a drive internal gear at an inner circumference of the drive rotator, the drive internal gear meshing with a driven gear to transmit the drive force to the driven rotator.

* * * * *